United States Patent [19]

Komiya et al.

[11] Patent Number: 5,801,349
[45] Date of Patent: Sep. 1, 1998

[54] STEERING WHEEL HORN SWITCH AND ITS PAD MOUNTING STRUCTURE

[75] Inventors: Fuminori Komiya; Sakashi Hattori; Keizoh Suzuki, all of Niwa-gun, Japan

[73] Assignee: Kabushiki Kaisha Tokai Rika Denki Seisakusho, Aichi, Japan

[21] Appl. No.: 687,524

[22] PCT Filed: Dec. 6, 1995

[86] PCT No.: PCT/JP95/02496

§ 371 Date: Aug. 7, 1996

§ 102(e) Date: Aug. 7, 1996

[87] PCT Pub. No.: WO96/17762

PCT Pub. Date: Jun. 13, 1996

[30] Foreign Application Priority Data

| Dec. 7, 1994 | [JP] | Japan | 6-303401 |
| Dec. 7, 1994 | [JP] | Japan | 6-303402 |
| Nov. 21, 1995 | [JP] | Japan | 7-302832 |

[51] Int. Cl.$^6$ .............................. H01H 9/00; B62D 1/02
[52] U.S. Cl. ................................ 200/61.55; 74/484 H
[58] Field of Search ........................ 200/61.54–61.57, 200/85 R, 86 R; 74/484 R, 484 H

[56] References Cited

U.S. PATENT DOCUMENTS

| 4,808,776 | 2/1989 | Niwa et al. | 200/61.55 |
| 5,023,412 | 6/1991 | Ishida | 200/61.54 |
| 5,235,146 | 8/1993 | Suzuki | 200/61.54 |
| 5,303,952 | 4/1994 | Shermetaro et al. | 200/61.55 X |
| 5,410,114 | 4/1995 | Furuie et al. | 200/61.55 |

FOREIGN PATENT DOCUMENTS

| 63-50418 | 4/1988 | Japan | H01H 13/08 |
| 1-73078 | 5/1989 | Japan | B62D 1/10 |
| 2-60072 | 5/1990 | Japan | B62D 1/11 |
| 3-40281 | 4/1991 | Japan | B62D 1/10 |
| 4-59473 | 2/1992 | Japan | B62D 1/04 |
| 5-246333 | 9/1993 | Japan | B62D 1/04 |

*Primary Examiner*—J. R. Scott
*Attorney, Agent, or Firm*—Birch, Stewart, Kolasch & Birch, LLP

[57] ABSTRACT

A structure for mounting a bracket for a horn pad on a metal core of a steering wheel has a simplified construction. Further, the number of upper contacts is reduced by controlling a movement of the horn pad. The mounting structure and arrangement result in a low cost of production. Generally, the mounting structure includes a plurality of leg parts formed on the metal core of the steering wheel. The leg parts extend generally parallel to a steering shaft. A cross bar is formed on a tip of each leg part. The horn pad's bracket is disposed between the metal core and the cross bars. Biasing devices, for biasing the bracket towards the cross bars are installed between the bracket and the metal core. Positioning devices, for positioning the bracket relative to an axis of the steering shaft are provided on the cross bars and the bracket. The biasing devices are installed at two locations on a lower side of the pad, and at two locations on an upper side of the pad. Upper horn switch contacts are installed at the middle part on the lower side of the pad, and at the right and left parts of the upper side of the pad.

17 Claims, 8 Drawing Sheets

STEERING WHEEL HORN SWITCH AND ITS PAD MOUNTING STRUCTURE

TECHNICAL FIELD

The present invention relates to a structure for mounting a pad, as an operational member for a horn switch, on a metal core of a steering wheel. The horn is blown by operating the pad which is located in a center of the steering wheel. The present mounting structure includes a particular arrangement and structure for the biasing means and switch contacts.

BACKGROUND ART

FIGS. 8 and 9 illustrate a general structure for mounting a pad, as an operational member for a horn switch, which is installed in a center of a steering wheel with four spokes. FIG. 8 is a front elevation view of the steering wheel 10 with the pad 11 (shown by an imaginary line) removed therefrom. FIG. 9 is a cross-sectional view taken on the line IX—IX in FIG. 8 in the direction of the arrows.

In the structure shown in the figures, a reference number 12 points to a bracket for mounting the pad 11. As shown in the figures, the bracket 12 is generally elongate plate if it is viewed from a side of the steering wheel 10, and a pair of brackets 12, are installed on the left and right sides relative to a center of the steering wheel 10 if viewed from the front. The bracket 12 has penetration holes 12a on its upper and lower ends, respectively.

A metal core 14 of the steering wheel 10 has four spokes 14a each of which has a boss 14b with a screw hole in a location corresponding to the penetration hole 12a of the bracket 12. A bracket 12 is mounted on the spoke 14a of the metal core 14 by a bolt 17. Bolt 17 passes through a bushing 13, a washer 18, and the penetration hole 12a of the bracket 12. The bolt 17 is screwed in the boss 14b after a spring receiving member 15 and a compressed coiled spring 16 are interlocked with each other and placed around the bolt 17.

When the bolt 17 is screwed down the bracket 12 for the pad is so biased by the spring 16 that the bracket 12 contacts a rear face of the head 17a of the bolt 17. When the pad 11 is pushed, the bracket 12 is movable towards the metal core 14 while the spring 16 is compressed. There is provided an upper contact 19 for the horn switch. A fixed contact (not shown) is provided on the metal core 14. With the structure, the horn is blown when the pad 12 is pushed down.

The structure, however, requires the spring receiving member 15, the washer 18 and the bushing 13, in addition to the bolt 17. Therefore, not only are the constituent parts of the structure complex, but also the mounting of the parts with each other is troublesome to carry out. Also, because the bolt 17 is a specially-made bolt, it is costly to manufacture.

FIG. 10 illustrates a steering wheel 10 having four spokes: a pair of spokes 10a and 10b which extend generally in a lateral direction from a center of the steering wheel, and a pair of spokes 10c and 10d which extend downward obliquely. The pad 11 is formed so as to cover each spoke 10a to 10d up to the middle part thereof. Four upper contacts 19a to 19d of the horn switch are installed generally at the right upper corner, left upper corner, right lower corner, and left lower corner of the pad 11, respectively. In the structure, there are installed compressed coiled spring assemblies 16a to 16d, for biasing the pad 11 towards the driver, adjacent to each corner of a square formed by the four upper contacts 19a to 19d. At least one of the upper contacts 19a to 19d is switched on when any part of the pad, such as the upper middle part, lower middle part, left middle part, right middle part, or corner parts, is pushed down.

SUMMARY OF THE INVENTION

From a view point of lowering the production cost, it is preferable to reduce the number of the upper contacts of the horn switch. However, the horn must reliably be activated when any part of the pad is pushed down. The direction in which the pad moves when a part of the pad is pushed down, is closely related to the locations of the compressed coiled spring assemblies 16a to 16d. Therefore, by setting the locations of the spring assemblies so as to limit the direction in which the pad moves and by providing the upper contacts at proper locations, the number of upper contacts can be reduced.

A structure for mounting a horn pad to a steering wheel, according to the present invention generally includes a plurality of leg parts formed on the metal core of the steering wheel. The leg parts extend generally parallel to a steering shaft. A cross bar is formed on a tip of each leg part. The horn pad's bracket is disposed between the metal core and the cross bars. Biasing devices, for biasing the bracket towards the cross bars are installed between the bracket and the metal core. Positioning devices, for positioning the bracket relative to an axis of the steering shaft are provided on the cross bars and the bracket. The biasing devices are installed at two locations on a lower side of the pad, and at two locations on an upper side of the pad. Upper horn switch contacts are installed at the middle part on the lower side of the pad, and at the right and left parts of the upper side of the pad.

One object of the present invention is to simplify the structure for mounting the bracket for the pad on the metal core of the steering wheel, thus realizing a low cost of production.

Another object of the present invention is to limit the movement possibilities of the pad, when the pad is pushed, so that the number of upper contacts can be reduced, thus realizing a low cost of production.

A structure, for mounting a pad for a horn switch of a steering wheel, according to the present invention, is the structure in which the pad is mounted on a metal core of the steering wheel through a bracket, wherein the metal core comprises a boss that is fixed to a steering shaft; a spoke that extends radially outwardly from the boss; and a wheel rim that connects with a tip of the spoke and is generally concentric to the boss. In order to realize the above object, the structure is improved by the following construction.

That is, in the structure, there is provided an engaging member which has a leg part that extends generally parallel to the steering shaft, and which has a hold-down part that is formed bent from a tip of the leg part, wherein the leg part is formed on one of the boss and the spoke of the metal core. The bracket is provided between the hold-down part of the engaging member and one of the boss and the spoke of the metal core, by sliding the bracket therebetween in a direction generally perpendicular to the leg part. In addition, there is provided biasing means for biasing the bracket towards the hold-down part of the engaging member. In this connection, an elastic member like a compressed coiled spring, or rubber band, or a similar device, can be used as the biasing means.

With the structure, the bracket normally is held or kept at a location at which it contacts the hold-down part of the engaging piece because the bracket is biased by the biasing means. When the bracket is pushed down along the steering shaft, the bracket is displaced while the biasing means such as the compressed coiled spring is deformed. Accordingly, the horn can be sounded at time of necessity, with a structure in which there is provided a horn contact which is switched-off when the pad is at a normal location at which the pad is biased towards a driver and which is switched on when the pad is pushed down, like a conventional horn.

On the other hand, according to the above structure, the constituent parts are not complex because the bracket being biased towards the driver is held by the engaging piece formed on the metal core in order to avoid the necessity for using a bolt, and any parts accompanying the bolt. And the assembling thereof is simple to perform as follows. That is, the assembling is done by inserting the bracket between the hold-down part of the engaging piece, and the boss or the spoke of the metal core, and by mounting the pad on the bracket. Also, because there is no need of a specially-made bolt as required in the conventional structure, it is possible to greatly lower a cost of production.

Also, in the above structure, it is preferable to provide positioning means for positioning the bracket with respect to an axis of the steering shaft, in order to prevent the bracket from being out of position. Particularly, it is preferable that the positioning means comprises a penetration hole, formed on one of the bracket and the hold-down part of the engaging member, which exists parallel to the steering shaft; and a pin, formed on the other thereof, which engages with the penetration hole.

With the structure, the positioning of the bracket with respect to the axis of the steering shaft can be performed only with the bracket and the metal core, without using other parts. Consequently, a complexity of the structure and a high cost of production are prevented; in addition, a troublesomeness of its assembling is avoided as well. Here, according to the conventional mounting structure using a bolt, the positioning of the bracket relative to the axis of the steering shaft is performed with the bolt itself. In the conventional case, because of many mounting parts, there is a possibility that a manufacturing error and an assembling error accumulate one after another, so that it results in a relatively great amount of the positional swerve of the bracket relative thereto. Meanwhile, according to the above structure of the present invention, because the positioning mechanism is comprised of only the pin and the hole, it is possible to reduce an amount of the positional swerve of the bracket.

Furthermore, in the above structure, it is preferable that the biasing means is provided symmetrically with respect to the hold-down part of the engaging member. With the structure, each bracket can be biased stably with a good balance, particularly if the bracket is of a type in which it comprises a plurality of separate divisions corresponding to each engaging member. Hence, the operational force for the pad is made stable, too.

By the way, in the above structure, it is possible to construct the metal core of the steering wheel and the engaging member as separate members, and to fix them by any fixing means such as a welding. However, forming the metal core of the steering wheel integrally with the engaging member as a die-casting casting, there is no need of such a fixing means, to prevent a high cost of production.

Also, according to the present invention, there is provided a mounting assembly for mounting a horn actuation pad to a steering wheel having a metal core. The mounting assembly includes a leg portion for connection to the metal core of the steering wheel. The leg portion extends in a first direction relative to the metal core when connected to the metal core. An extension portion is connected to the leg portion and extends in a second direction, different than the first direction. A bracket, which is inserted between the extension portion and the metal core by sliding the bracket therebetween in a direction generally perpendicular to the leg portion, is located between said extension portion and the metal core when the leg portion is connected to the metal core. The bracket is attachable to the horn actuation pad. A biasing device urges the bracket towards contact with said extension portion.

Also, according to present invention, there is provided a horn switch of a steering wheel being of a type with four spokes, two of which extend generally laterally from the boss, and the other two of which extend downwards obliquely, wherein the pad is formed as a one-piece operational member which covers each spoke from the boss up to a middle part of the spoke, wherein there are provided a plurality of the biasing means which are provided at one of a location corresponding to a right part and a left part on a lower side of the pad and a location corresponding to a middle part on the lower side of the pad, and at two locations on an upper side thereof an interval of which is greater than an interval between both operational ends of the lower side of the pad; and wherein there are provided contacts pairs, for the horn switch, which are provided at one location of the middle part on the lower side of the pad, and at two locations of the right and left parts on the upper side thereof.

With the structure, when the middle part on the upper side of the pad is pushed, the upper and lower sides of the pad are moved in a front and rear direction (The movement is, hereinafter, referred to as a longitudinal tilting.) about the horizontal axis passing through the biasing means which are mounted on the lower side of the pad. As a result of the movement, the two contacts on the upper side of the pad are switched on. On the other hand, if a left upper end of the pad, a right upper end thereof, a middle part on a left side of the pad, or a middle part on a right side thereof, is pushed down, the right and left sides of the pad are moved in a front and rear direction (The movement is, hereinafter, referred to as a lateral tilting.) about a generally vertical axis passing through the biasing means which is located opposite the end which is pushed down. As a result of the movement, either the contact on the left side of the pad, or the contact on the right side thereof is switched on.

On the other hand, when a middle, lower part of the pad is pushed down, the pad tilts longitudinally about a horizontal axis which passes through the biasing means on the upper side of the pad. As a result, the contact on the middle part of the lower side of the pad is switched on. On the other hand, when a left lower operational position of the pad, or a right lower operational position thereof is pushed down, the pad tilts longitudinally about the horizontal axis passing the biasing means on the upper side of the pad, so that the contact on the middle part of the lower side of the pad is switched on as well. This is because the left and right lower operational positions of the pad exist in an inner field between the biasing means on the upper side of the pad, in view of its dimension.

In this way, according to the above structure, no matter what location of the lower side of the pad may be pushed, the pad moves longitudinally about the horizontal axis. Therefore, in spite that there is mounted only one contact on the lower side thereof, the switch is surely turned on. In other words, according to the above structure, the direction in which the pad is moved is limited by setting the biasing means at predetermined locations so that the contacts are reduced in number, thus possible to lower the cost of production.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Referring to FIGS. 1 through 4, a steering wheel having a pad mounting structure for a horn switch, according to a first embodiment of the present invention, is illustrated.

Figure 1:
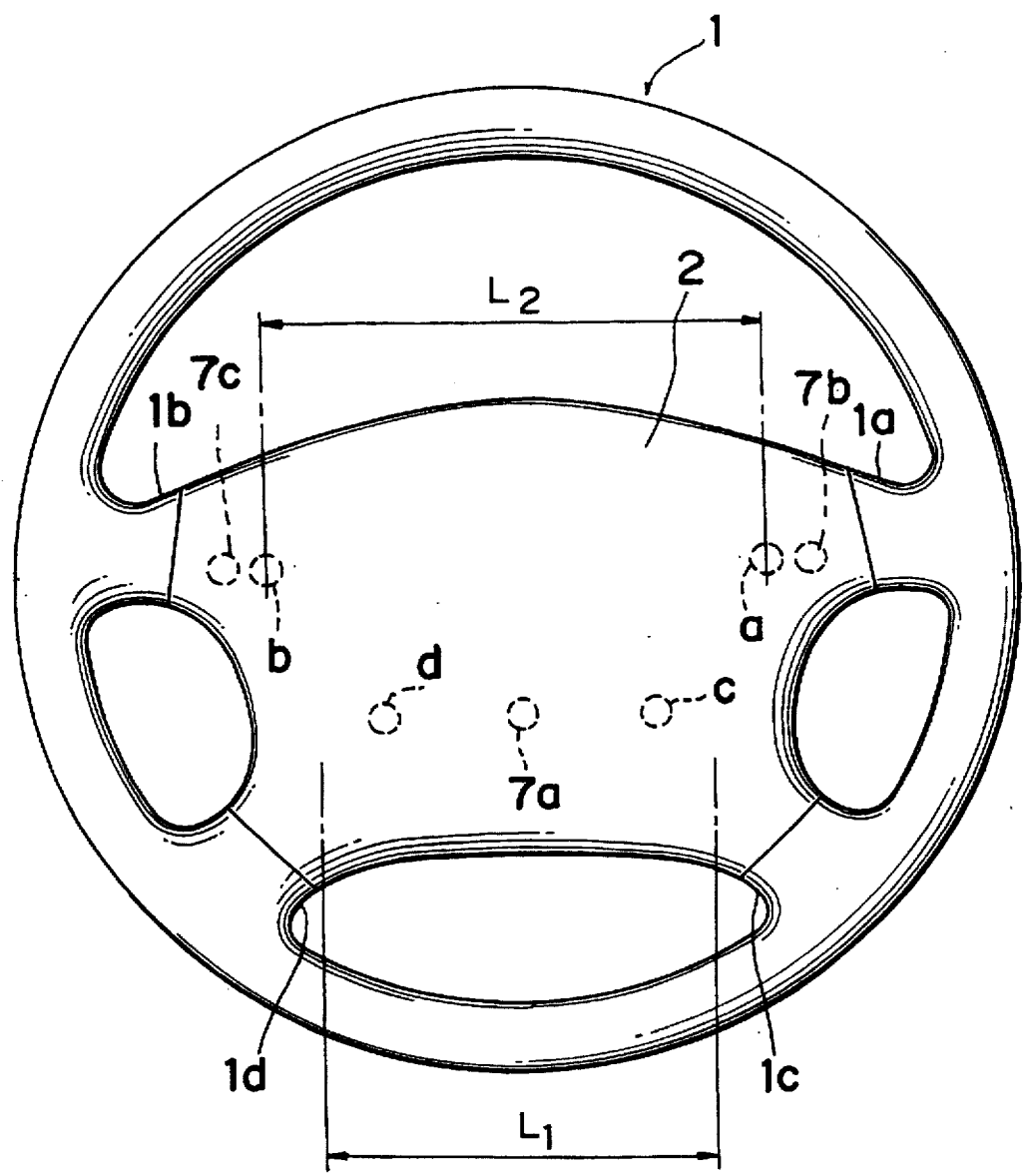
FIG. 1 is a front view showing an embodiment of a steering wheel to which a horn switch and a pad mounting structure according to the present invention apply.

FIG. 1 is a front view showing the steering wheel 1. As shown in the figure, the steering wheel 1 is of a type with four spokes: a pair of spokes 1a and 1b which extend generally in a lateral direction from a center of the wheel; and a pair of spokes 1c and 1d which extend downward obliquely. The steering wheel 1 has a pad 2 for actuating a horn switch. The pad 2 covers the steering wheel from a center of the steering wheel up to a middle part of each spoke 1a through 1d.

Figure 2:
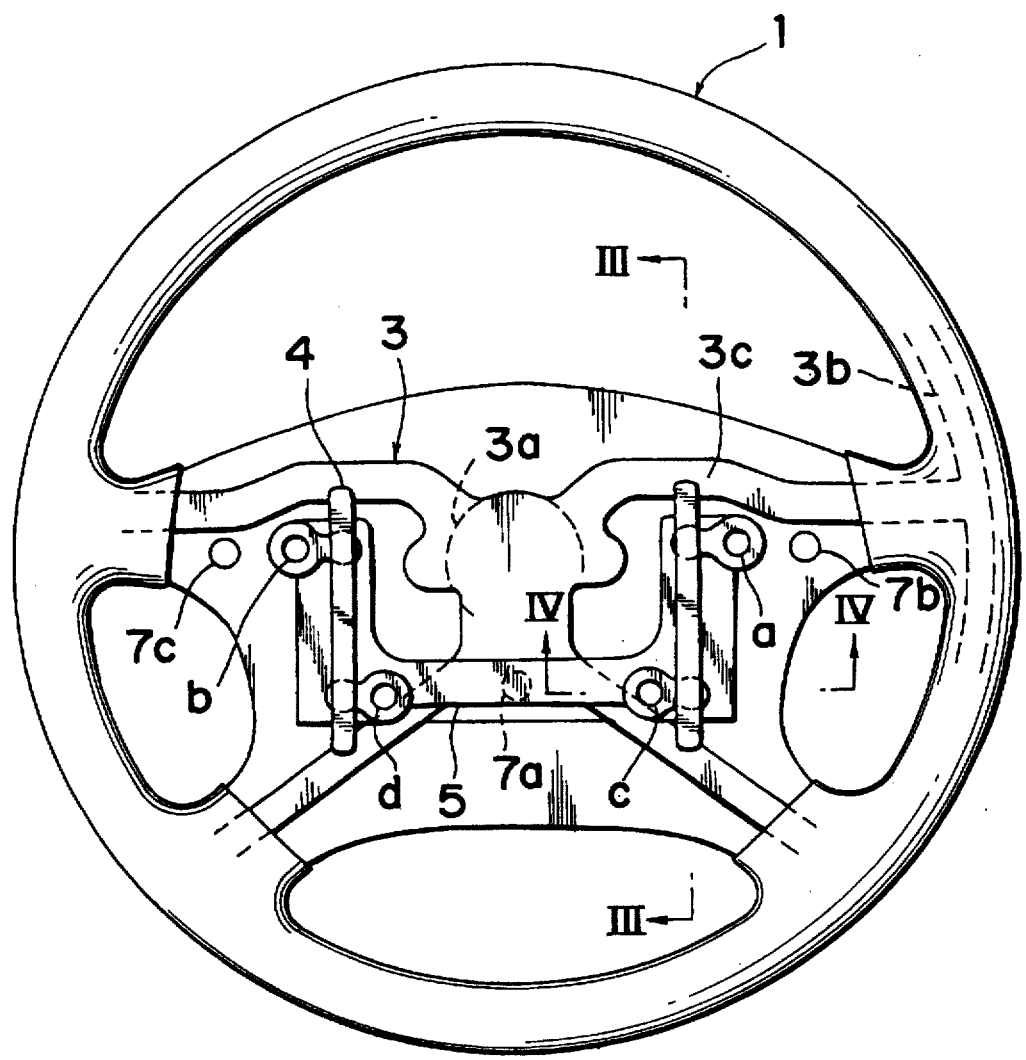
FIG. 2 is a front view of the steering wheel of FIG. 1 with the pad being removed therefrom.

FIG. 2 is a front view of the steering wheel with the pad 2 being removed therefrom. The steering wheel 1 has a metal core 3 which includes a boss 3a, at the center, mounted on a steering shaft (now shown in the figure). A wheel rim 3b is generally concentric to the boss 3a. Four spokes 3c connect the boss 3a and the wheel rim 3b. The spokes 3c of the metal core 3 are provided with a pair of bridges 4 which extend laterally symmetrically about the boss 3a.

Figure 3:
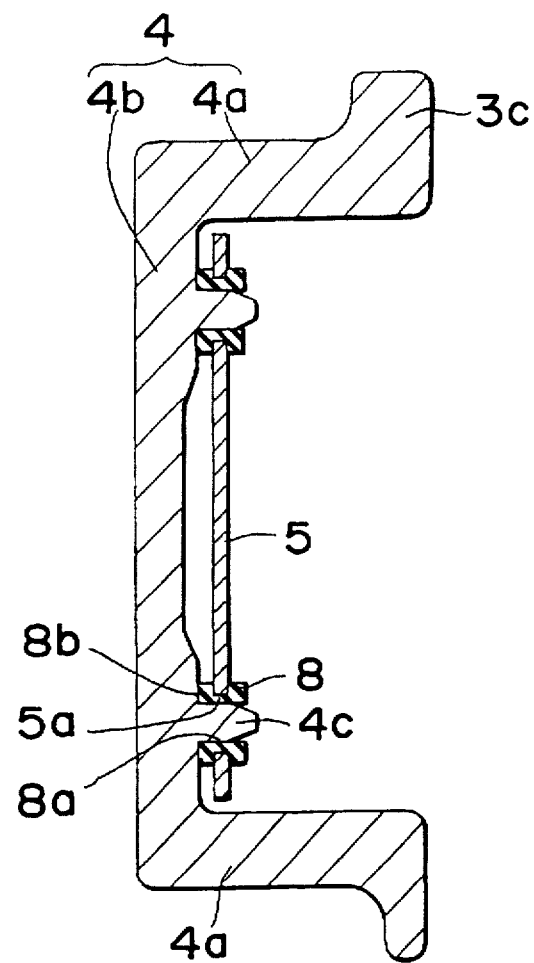
FIG. 3 is a cross-sectional view taken on the line III—III of FIG. 2.
Figure 4:
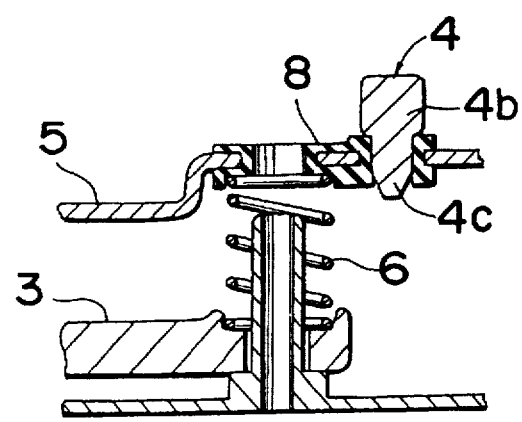
FIG. 4 is a cross-sectional view taken on the line IV—IV of FIG. 2.

As shown in FIG. 3, the bridge 4 is comprised of a leg part 4a which extends from each spoke 3c, and a cross bar 4b which links between a pair of leg parts 4a, 4a. The metal core 3 is a die-cast metal with the bridge 4 being integrated therewith. A bracket 5, for attachment to the pad 2, is provided between the spoke 3c and the cross bar 4b. Although not shown in detail, the pad 2 is fixed to the bracket 5. The bracket 5 includes a part overlapping the cross bar 4b which is designated as a contacting surface.

The bracket 5 has a penetration hole 5a, extending parallel to the steering shaft, at the location corresponding to the contact surface thereof. The bracket 5 is provided with a bushing 8, formed integrally with the bracket 5, in the penetration hole 5a. The bushing 8 has a hole 8a. The cross bar 4b is provided with a pin 4c on a lower side thereof. The pin 4c engages the hole 8a of the bushing 8. The hole 8a and the pin 4c cooperate to position the bracket 5 with respect to the center of the steering wheel 1. A front surface 8b of the bushing 8 is the contacting surface, as mentioned above.

A compressed coiled spring 6 is provided as a biasing means for biasing the pad 2 towards a driver. The compressed coil springs 6 is located between the bracket 5 and the metal core 3. As shown in FIG. 1, the compressed coiled spring 6 are mounted at four points "a" to "d" which constitute a trapezoid with an upper side being longer than a lower side thereof. The compressed coiled spring "a" and "b" are disposed at the upper locations. Coiled spring "a" and "b" are arranged a distance L2 apart which is substantially greater than a distance L1 which corresponds to a separation between lower coiled springs "c" and "d". It is also possible to use a leaf spring instead of the compressed coiled spring 6. If using the leaf spring, the leaf spring may be set on the bracket in advance of assembly.

The upper contacts 7a to 7c for the horn switch are arranged at three locations: one in the middle part of the lower side of the pad 2; and two at the right and left ends of the upper side thereof. Although not shown in detail, each upper contact 7a through 7c for the horn switch is fixed on the pad. Each upper contact 7a through 7c is capable of movement, via pad pressure, to contact a respective fixed contact fixed on the metal core 3 of the steering wheel 1. The movable, upper contacts are usually separated from the fixed contact. When the pad 2 is pushed down against the biasing force of the compressed coiled spring 6, which bias the pad towards the driver, at least one of the movable, upper contacts contact at least one of the fixed contacts to close the horn circuit.

In the above structure, the bracket 5 for the pad is normally biased by the compressed coiled spring 6. Therefore, the contacting surface 8b of the bushing 8 is kept at a location where the contacting surface 8b contacts the cross bar 4b of the bridge 4. When the pad 2 is pushed down, the bracket 5 is displaced while the springs 6 are deformed or bent. As a result, at least one of the upper contacts 7a to 7c is caused to contact at least one of the third contacts. Therefore, the bracket 5, of the present invention, operates in the same way as a bracket, which is mounted on a metal core by a bolt, as in conventional, meaning, the operation of the horn switch can be performed in the conventional manner.

The bracket 5 is biased towards the driver and held by the bridge 4 provided on the metal core 3. Also, the bracket 5 is positioned with respect to the axis of the steering wheel 1 only with the pins 4c of the bridges 4 and the holes 8a of the bushings 8. Therefore, there is no need for any specially-made bolts or accompanying components for the specially-made bolts. The construction of the components is simplified. Furthermore, the above structure has an advantage in that the assembling thereof is simple to be performed. Namely, the bracket 5 is inserted between the cross bar 4b and the spoke 3c of the metal core 3, and then the pad 2 is mounted on the bracket 5. Since there is no need for any specially-made bolt, and the bridge 4 can be cast integrally with the metal core 3 of the steering wheel 1, it is possible to lower a production cost.

When pressing the horn pad 2, if a middle, upper part of the pad 2 is pushed down, the pad 2 tilts longitudinally about a horizontal axis which passes through the compressed coiled springs 6 mounted at locations "c" and "d" on the lower side of the pad. This results in the two contacts 7b and 7c on the upper side of the pad being caused to contact their respective fixed contacts. If a left upper end of the pad 2, a right upper end thereof, a middle part on a left side thereof, or a middle part on a right side thereof, is pushed down, the pad 2 tilts laterally with respect to a generally vertical axis passing through the compressed coiled spring 6 mounted at the location "a" or "b" which is located opposite the end which is pushed down, so that either the upper contact 7c on the left side of the pad, or the upper contact 7b on the right side thereof is caused to contact a respective fixed contact.

If a middle, lower part of the pad 2 is pushed down, the pad 2 tilts longitudinally about a horizontal axis which passes through the compressed coiled springs 6 mounted at locations "a" and "b" on the upper side of the pad, so that the upper contact 7a on the middle part of the lower side of the pad is caused to contact its respective fixed contact. If a left lower position of the pad 2, or a right lower position thereof is pushed down, the pad 2 tilts longitudinally about the horizontal axis passing through the compressed coiled spring 6 mounted at locations "a" and "b" on the upper side of the pad 2, so that the upper contact 7a on the middle part of the lower side of the pad 2 is caused to contact its respective fixed contact. This is because the left and right lower operational positions exist in an inner field between the compressed coiled springs 6 mounted at the locations "a" and "b" on the upper side of the pad, in view of the dimensions L1 and L2.

Therefore, no matter what part of the middle or end parts of the lower side of the pad 2 is pushed, the pad 2 moves longitudinally about the horizontal axis passing through the compressed coiled springs 6 mounted at locations "a" and "b". Therefore, even though there is mounted only one upper contact 7a on the lower side thereof, the horn is still able to be operated. In other words, it is possible to reduce the number of contacts and to lower the cost of production, without affecting the horn's operability. Alternatively, although a pair of coiled springs 6 are mounted on the lower right and left sides of the pad, according to the above structure, only one coiled spring may be mounted at a center of the lower side of the pad.

Figure 5A:
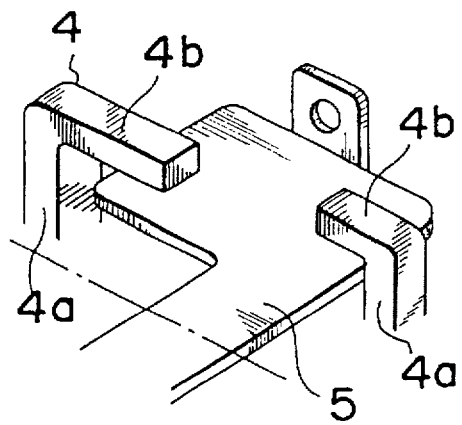
FIGS. 5(a) through 5(e) are perspective views showing modifications of the engaging piece and the bracket.

The present invention is not limited to the above bridge 4. The bridge 4 can be modified. In the above structure, two bridges 4, each of which comprises the upper and lower leg parts 4a are formed on the spokes 3c of the metal core 3. The upper and lower leg parts 4a are connected with the cross bar 4b. The bracket 5 is mounted under the cross bar 4b. As a modification, the upper and lower leg parts 4a, 4a do not necessarily have to be connected by the cross bar 4b. Instead, the bracket 5 may be kept by separate engaging members 4b. Engaging members 4b are like crossbar 4b except the cross bar of the bridge is divided midway. Each bridge 4 would then comprise a leg part 4a, and a hold-down part 4b that bends inwardly towards the inside of the steering wheel 1 from a tip of the leg part 4a, as shown in FIG. 5(a).

Figure 5B:
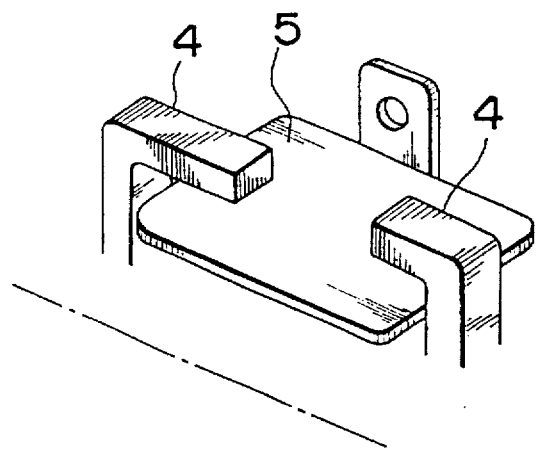
Figure 5C:
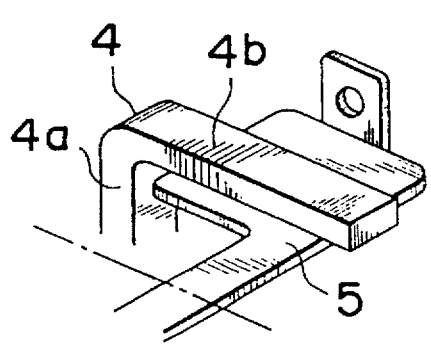
Figure 5D:
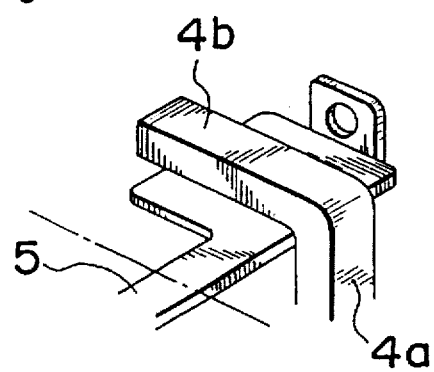

As shown in FIG. 5(b), the bracket 5 may be comprised of separate members one on the left and one on the right sides of the steering wheel (FIG. 5 illustrates only one member). Furthermore, as shown in FIGS. 5(c) and(d), the bridge may be formed in a L-shape with the hold-down part 4b, corresponding to the cross bar of the bridge, being supported with only one leg part 4a. FIGS. 5(c) and(d) illustrate structures in which only the locations of the leg parts 4a differ from each other. In the embodiment of FIGS. 5(c) and 5(d), the bracket 5 may also be comprised of two separate members on the left and right sides (although not shown in the figures). FIG. 5(e) illustrates a T-shaped bridge in which a leg part 4a is formed in the middle of the hold-down part 4b. In this case, it is preferable to use a pair of U-shaped brackets 5. During assembly, one can easily insert the brackets 5 respectively from outside of a pair of engaging pieces 4.

Figure 5E:
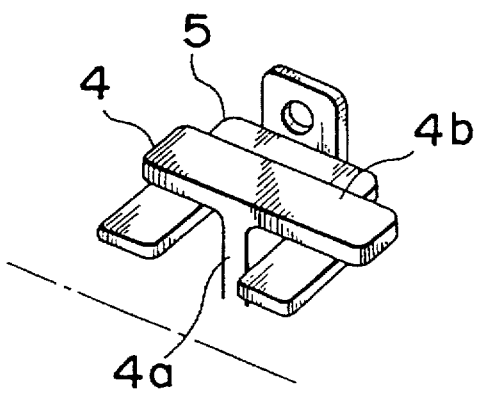
Figure 5F:
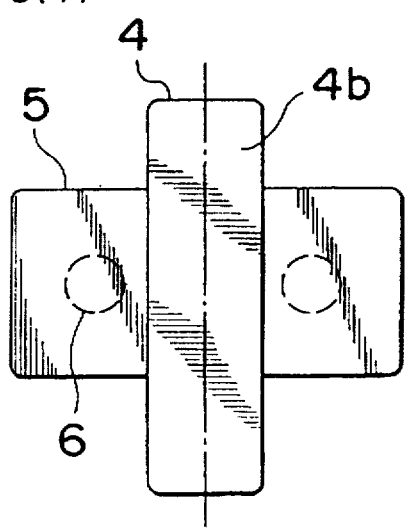
FIG. 5(f) is a view showing locations of the biasing means.

For the embodiments of FIGS. 5(b) and 5(e), it is preferable to mount the biasing means 6 symmetrically with respect to a center line of the hold-down part 4b of the engaging piece 4. With this placement of the biasing means, the bracket 5 is properly balanced when biased against the hold-down part 4b of the engaging piece 4. When the bracket 5 is a one-piece type, as shown in FIGS. 2, 5(a), 5(c) and 5(d), it is necessary to totally balance the bracket 5. In order to balance the bracket 5, the biasing means may be mounted at three locations.

Figure 6A:
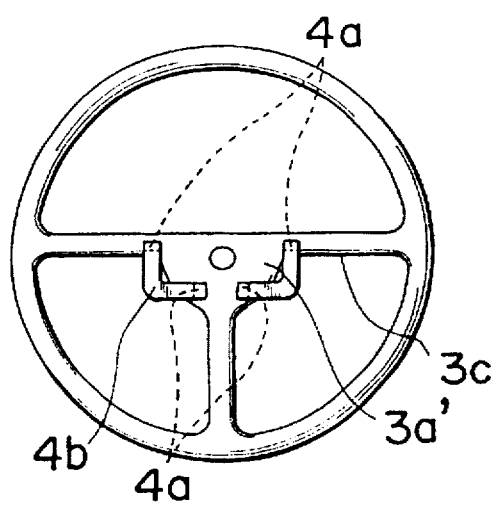
FIGS. 6(a) and 6(b) are front views showing steering wheels with three spokes on which bridges are mounted.
Figure 6B:
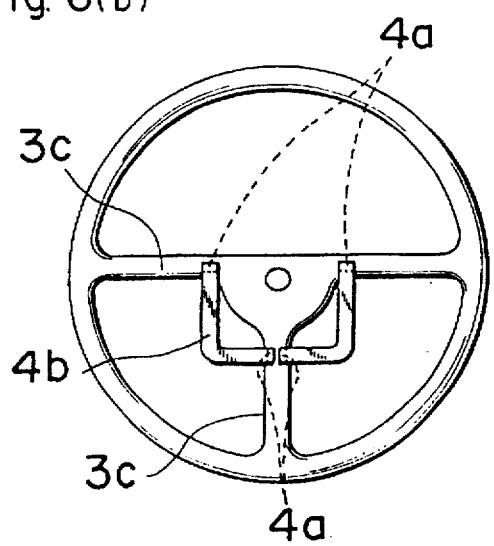

The above structures are examples showing that the present invention applies to a steering wheel with four spokes. It is also possible to apply the present invention to a steering wheel with two spokes, three spokes, etc. Furthermore, the leg part 4a may be formed on the boss 3a. FIGS. 6(a) and(b) illustrate that the present invention applies to a steering wheel with three spokes. In the structure shown in FIG. 6(a), the leg parts 4a are formed on both lateral spokes 3c and a boss plate part 3a' (which is a plate part surrounding the boss). The hold-down parts 4b are bent in form. In the structure shown in FIG. 6(b), the leg parts 4a are formed on both lateral spokes 3c and a longitudinal spoke 3c. The hold-down parts 4b are bent in form as well.

Figure 7A:
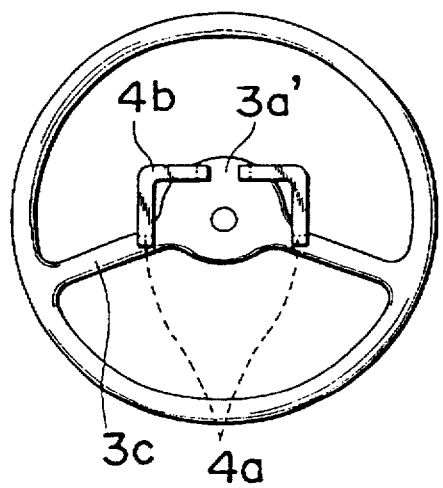
FIGS. 7(a) and 7(b) are front views showing steering wheels with two spokes on which bridges are mounted.
Figure 7B:
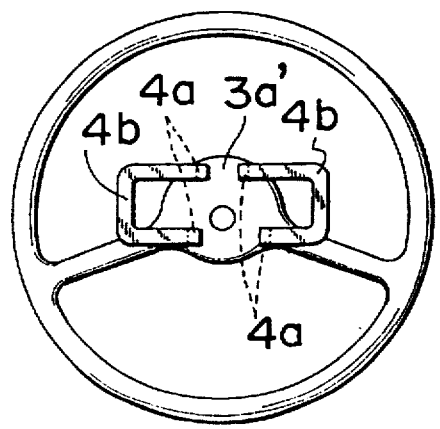
Figure 8:
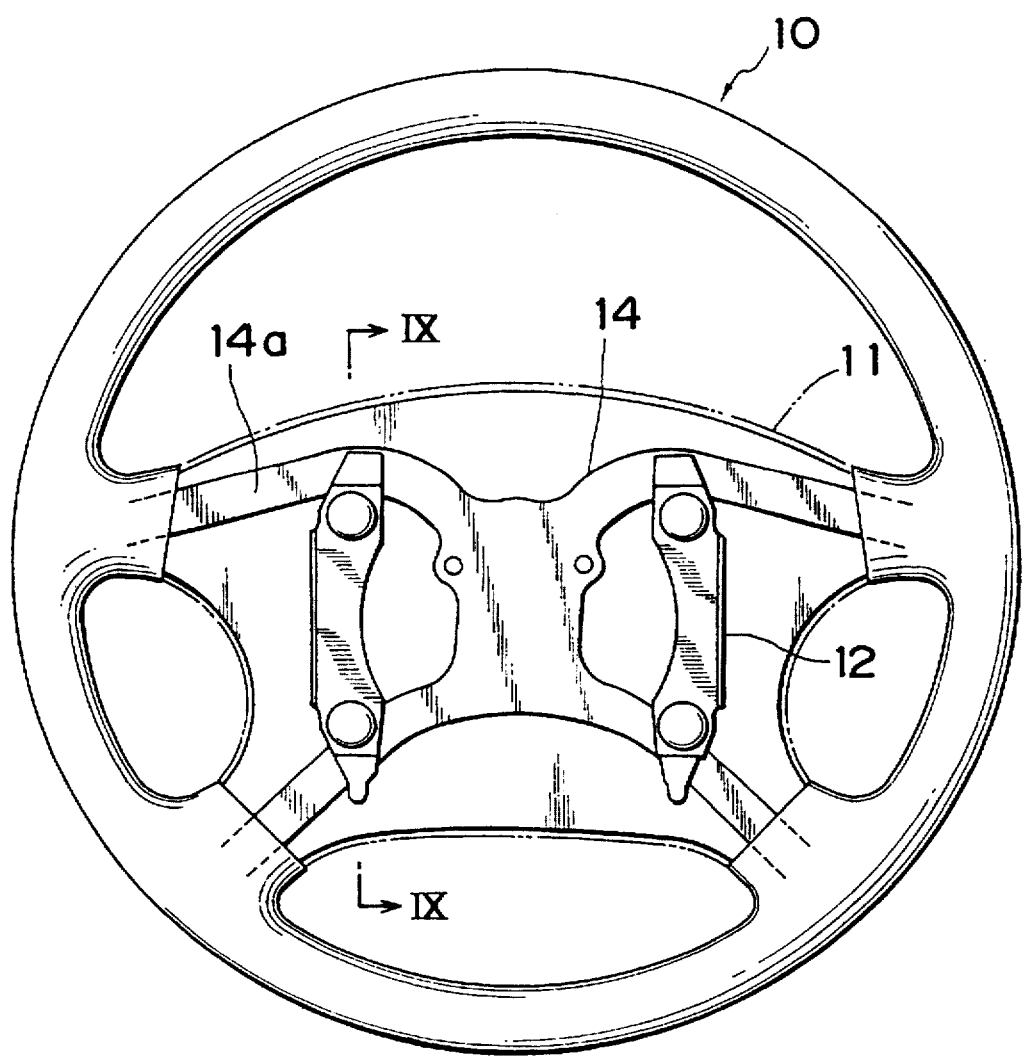
FIG. 8 is a front view of a steering wheel with a pad mounting structure for a horn switch according to the prior et with a pad being removed therefrom.
Figure 9:
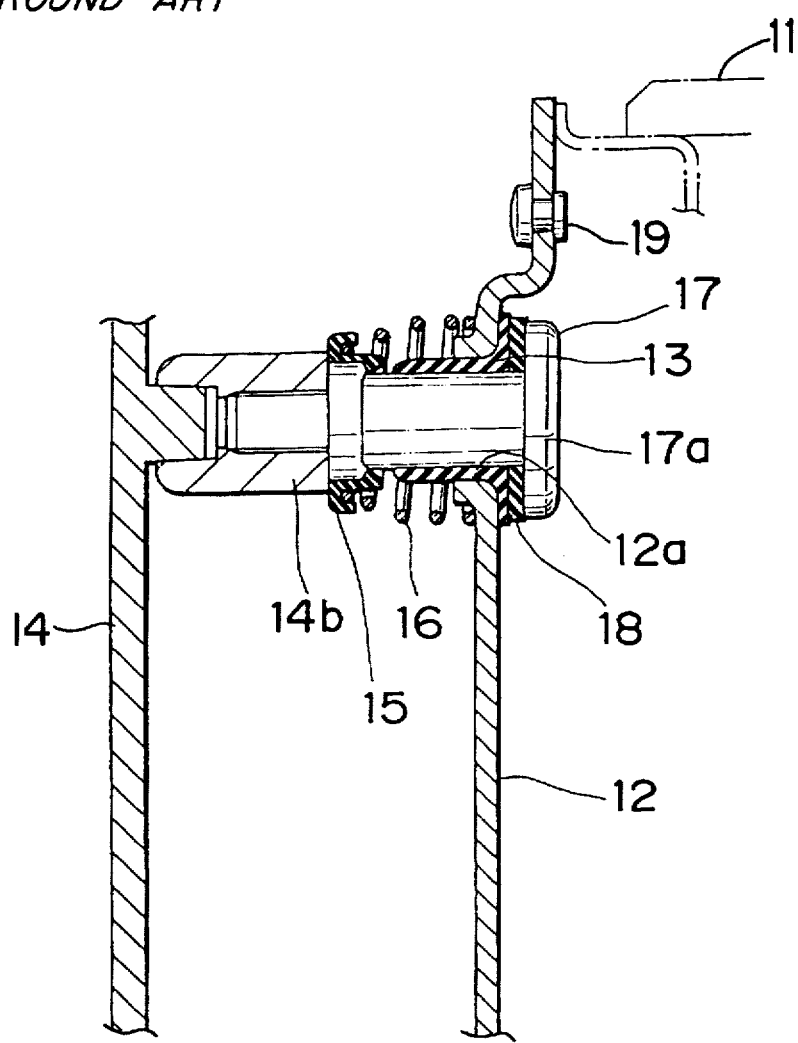
FIG. 9 is a cross-sectional view taken on the line IX—IX of FIG. 8.
Figure 10:
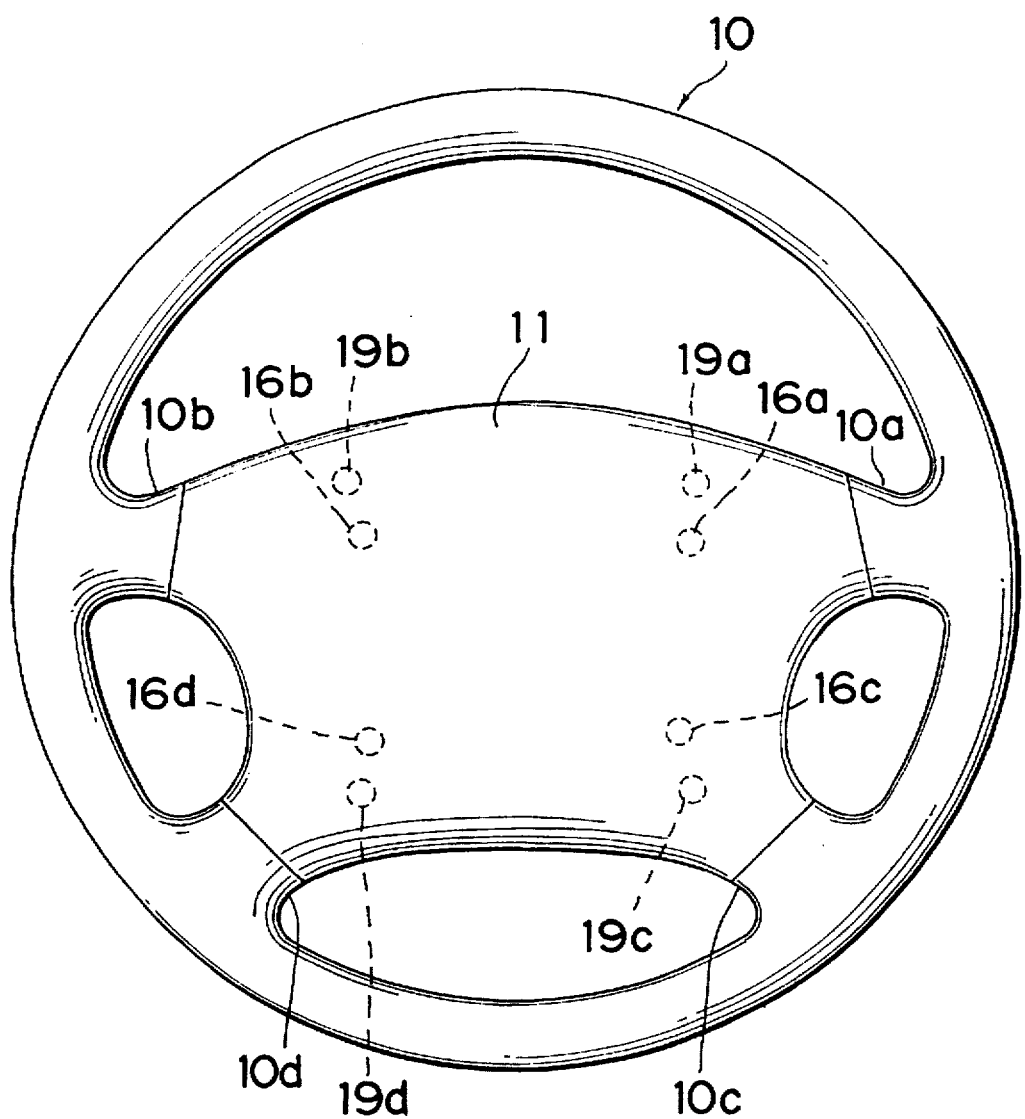
FIG. 10 is a front view of a steering wheel with a horn switch according to another embodiment of the prior art.

Furthermore, FIGS. 7(a) and(b) show that the present invention applies to a steering wheel with two spokes. In the structure shown in FIG. 7(a), the leg parts 4a are formed on both spokes 3c and a boss plate 3a'. The hold-down parts 4b are bent in form. In the structure shown in FIG. 7(b), the leg parts 4a are formed on the boss plate 3a'. The hold-down parts 4b are bent in a U-shape. Through not shown in the figure, the engaging piece 4 may be formed as a separate member from the metal core 3, and the engaging piece 4 may be fixed to the metal core 3 by means of welding, etc. In each of these modifications, the bracket for the horn's pad may be mounted to the steering wheel and operated as in the examples shown in FIGS. 1 through 4.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

We claim:

1. A structure, for mounting a pad for a horn switch of a steering wheel, in which the pad is mounted on a metal core of the steering wheel through a bracket, wherein the metal core comprises a boss that is fixed to a steering shaft; a spoke that extends radially outwardly from the boss; and a wheel rim that connects with a tip of the spoke and is generally concentric to the boss, the structure comprising:

an engaging member which has a leg part that extends generally parallel to the steering shaft, and which has a hold-down part that is formed bent from a tip of the leg part, wherein the leg part is formed on one of the boss and the spoke of the metal core, wherein the bracket is provided between the hold-down part of the engaging member, and one of the boss and the spoke of the metal core, by sliding the bracket therebetween in a direction generally perpendicular to the leg part, and wherein there is provided biasing means for biasing the bracket towards the hold-down part of the engaging member.

2. The structure as claimed in claim 1, which comprises positioning means for positioning the bracket with respect to an axis of the steering shaft.

3. The structure as claimed in claim 2, wherein the positioning means comprises a member, having penetration hole, provided on one of the bracket and the hold-down part of the engaging member, in which the penetration hole exists parallel to the steering shaft; and a pin, formed on the other thereof, which engages with the penetration hole.

4. The structure as claimed in claim 1, wherein the biasing means is mounted symmetrically with respect to the hold-down part of the engaging member.

5. The structure as claimed in claim 1, wherein the metal core of the steering wheel and the engaging member are formed as separate members, wherein the metal core and the engaging member have fixing means for fixing each other.

6. The structure as claimed in claim 1, wherein the steering wheel is of a type with four spokes, two of which extend generally laterally from the boss, and the other two of which extend downwards obliquely, wherein the pad (2) is formed as a one-piece operational member which covers each spoke, from the boss up to a middle part of the spoke, wherein there are provided a plurality of the biasing means which are provided at one of a location corresponding to a right part and a left part on a lower side of the pad and a location corresponding to a middle part on the lower side of the pad, and at two locations on an upper side thereof an interval of which is greater than an interval between both operational ends of the lower side of the pad; and wherein there are provided contact pairs, for the horn switch, which are provided at one location of the middle part on the lower side of the pad, and at two locations of the right and left parts on the upper side thereof.

7. A mounting assembly for mounting a horn actuation pad to a steering wheel having a metal core, said mounting assembly comprising:

a leg portion for connection to the metal core of the steering wheel, said leg portion extending in a first direction relative to the metal core when connected to the metal core;

an extension portion connected to said leg portion and extending in a second direction, different than said first direction;

a bracket, which is inserted between said extension portion and the metal core by sliding said bracket therebetween in a direction generally perpendicular to the leg portion, so that said bracket is located between said extension portion and the metal core when said leg portion is connected to the metal core, said bracket being attachable to the horn actuation pad; and a biasing device urging said bracket towards contact with said extension portion.

8. The mounting assembly defined in claim 7, wherein said second direction is substantially perpendicular to said first direction.

9. The mounting assembly defined in claim 7, further comprising:

a positioning device located on said extension portion and said bracket, said positioning device limiting movement of said bracket relative to said extension portion to substantially one direction.

10. The mounting assembly defined in claim 9, wherein said positioning device is a hole and pin arrangement, wherein said pin slides inside said hole to allow the movement limited to substantially one direction.

11. The mounting assembly defined in claim 7, wherein said leg portion is formed integrally with the metal core.

12. The mounting assembly defined in claim 7, wherein said leg portion is connected to the metal core by an attachment device.

13. The mounting assembly defined in claim 7, wherein the steering wheel is connectable to a steering shaft which extends in a shaft direction, said first direction being substantially parallel to the shaft direction.

14. The mounting assembly defined in claim 13, further comprising:

a positioning device located on said extension portion and said bracket, said positioning device limiting movement of said bracket relative to said extension portion to substantially one direction which is substantially parallel to the shaft direction.

15. A steering wheel assembly comprising:

a core for attachment to a steering shaft;

a bracket fixed for reciprocal movement relative to said metal core;

a horn actuation pad attached to said bracket;

four biasing assemblies, each for biasing said bracket away from said core, said four biasing assemblies forming four corners of a trapezoidal shape; and three switch assemblies, two of said three switch assemblies being located adjacent to two of said four biasing assemblies and a third of said three switch assemblies being located between another two of said four biasing assemblies.

16. The steering wheel assembly defined in claim 15, wherein said two of said four biasing assemblies are separated by a distance L1, said another two of said four biasing assemblies are separated by a distance L2, and said distance L1 is greater than said distance L1.

17. A structure, for mounting a pad for a horn switch of a steering wheel, in which the pad is mounted on a metal core of the steering wheel through a bracket, wherein the metal core comprises a boss that is fixed to a steering shaft; a spoke that extends radially outwardly from the boss; and a wheel rim that connects with a tip of the spoke and is generally concentric to the boss, the structure comprising:

an engaging member which has a leg part that extends generally parallel to the steering shaft, and which has a hold-down part that is formed bent from a tip of the leg part, wherein the engaging member is integrally formed with the metal core, wherein the bracket is provided between the hold-down part of the engaging member, and one of the boss and the spoke of the metal core, and wherein there is provided biasing means for biasing the bracket towards the hold-down part of the engaging member.

* * * * *